Jan. 27, 1942.   B. SAUER   2,271,208
RESISTANCE DEVICE
Filed Oct. 18, 1940

INVENTOR
*Bruno Sauer*
BY
ATTORNEY

Patented Jan. 27, 1942

2,271,208

UNITED STATES PATENT OFFICE 2,271,208

RESISTANCE DEVICE

Bruno Sauer, Berlin-Oberschoneweide, Germany, assignor to General Electric Company, a corporation of New York Application October 18, 1940, Serial No. 361,650
In Germany August 7, 1939

2 Claims. (Cl. 179—171)

It is known in the art to utilize indirectly heated resistances with temperature effect, more particularly uranium dioxide (or so-called Urdox) resistances for regulating purposes, for instance, to gain regulation of amplifiers. Now, practical experience has shown that with the temperature-dependent resistances heretofore customarily employed the regulator response or sensitiveness obtainable directly proves often insufficient, in other words, the characteristic is not sufficiently steep.

Now, the present invention suggests other ways and means to the same end, that is, essentially to improve the characteristic.

The object of the invention is a method adapted to steepen the characteristic of an indirectly heated temperature-dependent resistance such as an uranium dioxide resistance. The method has this outstanding feature that the heater element of the resistance is fed from a generator the internal resistance of which is high compared with the resistance of the heater, and that the heater consists of a material having a high positive temperature coefficient.

To be sure, it is known from directly heated resistances to connect resistances of this kind in cascade with a view to steepening the characteristic. However, this method involves the drawback that it requires comparatively elaborate circuit means. This drawback is obviated in the invention; in fact, the desired effect is obtainable with essentially simpler ways and means.

Figure 1:
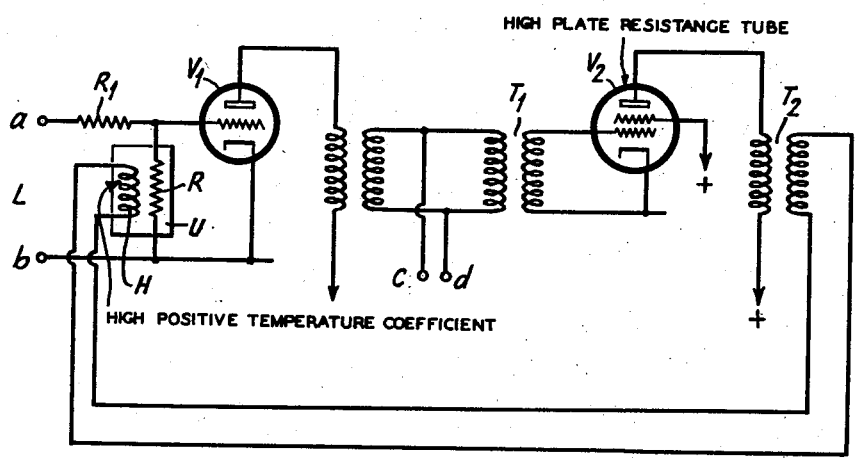
Figure 2:
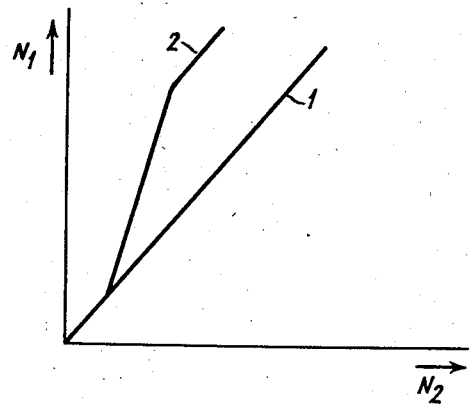

The basic idea of the invention shall be described more fully in what follows by reference to Figs. 1 and 2 of the appended drawing. Fig. 1 shows an exemplified embodiment of the method here disclosed as applied to the gain control of an amplifier, while Fig. 2 is designed to explain the operation of the scheme Fig. 1.

Referring to Fig. 1, $V_1$ is an amplifier tube to be subjected to volume control. The assumption is that this tube by way of line L and the input terminals $a$, $b$, is impressed with a potential which, as a result of atmospheric agencies and influences and attendant line damping, is subject to certain fluctuations as a function of the time. The problem of the gain control means is to maintain across the output terminals $c$, $d$, of tube $V_1$ a constant output voltage level which is unaffected by and independent of fluctuations of the input potential. To this end, in a way known in the art, the output potential prevailing across the terminals $c$, $d$, for instance by way of a transformer $T_1$, is fed to an amplifier tube $V_2$, where it is amplified and then supplied through an input transformer $T_2$ to the heater H of a uranium dioxide resistance U which conjointly with an ohmic resistance $R_1$ in the input circuit of the amplifier tube $V_1$ forms a voltage divider for the input potential of the said tube.

Now, it is often necessary that the output level should stay independent even of extremely small input level fluctuations, in other words, that also the sensitiveness of the regulator means should be correspondingly high. This requirement according to the invention is satisfied in the following way:

In the first place, the inner resistance of the amplifier tube $V_2$ is made high compared with the resistance of the heater, say, ten times higher; hence, the tube $V_2$ should be preferably a pentode. In the second place, the Urdox resistance U is of a type consisting of material having a high positive temperature coefficient rather than of a low positive coefficient as has heretofore been customary, with the result that the resistance value thereof will exhibit an appreciable growth even if the temperature, that is, the strength of current increases but little. Material of this kind is used, for instance, in iron-hydrogen resistances known in the prior art.

To further explain the operation of the arrangement shown in Fig. 1, the following may be stated: If the heater H of the uranium dioxide resistance consists of a material having only a low temperature coefficient, then the gain of tube $V_2$ is practically independent of slight fluctuations of the grid potential impressed thereon inasmuch as the resistance of the heater which represents the external resistance of the tube, will practically not be altered in this case. But if the heater is made of a material possessing a high positive temperature coefficient, then the amplification of tube $V_2$, even if the grid potential grows but slightly, will become appreciably greater inasmuch as the resistance of the heater in this case grows also. As a consequence of the increase in the gain of tube $V_2$, there occurs, on the other hand, simultaneously a growth of the heating energy fed to the uranium dioxide resistance. This results in a by far greater decrease in the resistance value in the resistance body or element R of the uranium dioxide resistance U made of material with a negative temperature coefficient than in the case where the gain of the tube $V_2$ is stable. The regulating sensitiveness of the circuit organization Fig. 1 therefore turns out to be particularly high in a circuit organization as here disclosed.

This fact will follow also from an examination of Fig. 2 where the power $N_1$ fed to the heater of the uranium dioxide resistance U is plotted against the output power $N_2$ across the terminals $c$, $d$, of tube $V_1$. Graphs 1 and 2 refer to the case where the heater consists of a material having a low and a high positive temperature coefficient. Material having a high positive temperature coefficient is used, for instance, in iron-hydrogen resistances known in the art. It will be seen that graph 2 in the middle range between the bottom and upper knee, exhibits far greater steepness than curve 1 so that within the said range regulation at correspondingly greater sensitiveness and responsiveness is feasible.

Tests have shown that the heater should preferably consist of an iron wire as long as possible. This iron wire is only in certain short sections of a nature so that it will be markedly heated under operating conditions. If unduly short wires were used this would involve the risk of no, or too few, such characteristic portions existing in the heater, with the result that the desired and expected result fails to be obtained.

In order to make the heating of the resistance U as uniform as possible, it is moreover, advantageous to surround the heater with material possessing high heat conducting properties, such as copper or nickel.

It will be understood that the invention is not restricted to the exemplified embodiment here shown and described in connection with gain regulation in amplifiers, indeed, it is generally useful wherever, in regulating means comprising indirectly heated temperature-dependent resistances, the chief aim is to obtain maximum sensitiveness of the regulator device.

I claim:

1. In a wave transmission system having input and output circuits, a temperature-dependent resistance element connected in the input circuit to control the attenuation thereof, a heater element for said element, an electron discharge tube having input electrodes coupled to said output circuit, means coupling said heater element to the output electrodes of said tube, the internal resistance of said tube being high compared to the resistance of said heater element, said heater being composed of a material having a high positive temperature coefficient.

2. In a wave transmission system having input and output circuits, a temperature-dependent resistance element connected in the input circuit to control the attenuation thereof, said resistance element being composed of a material having a high positive temperature coefficient, a heater element for said element, an electron discharge tube having input electrodes coupled to said output circuit, means coupling said heater element to the output electrodes of said tube, the internal resistance of said tube being high compared to the resistance of said heater element, said heater being composed of a material having a high positive temperature coefficient.

BRUNO SAUER.